INVENTOR.
John LeValley
BY
HIS ATTORNEY.

Patented Nov. 10, 1931

1,831,601

UNITED STATES PATENT OFFICE

JOHN LE VALLEY, OF PAINTED POST, NEW YORK, ASSIGNOR TO INGERSOLL-RAND COMPANY, OF JERSEY CITY, NEW JERSEY, A CORPORATION OF NEW JERSEY

VALVE MECHANISM

Application filed June 22, 1928. Serial No. 287,419.

This invention relates to valve mechanism and more particularly to unloading valves utilized for diminishing the pumping capacity of a compressor and the like.

It is an object of this invention to prevent the valve from pounding on its seat. To this end there is provided an oil dash pot operatively connected with the valve to cause the said valve to open and close relatively slowly and without material vibration.

It is a further object of the invention to prevent leakage of oil from the dash pot mechanism. Other objects and advantages of the invention will be in part obvious and in part pointed out hereinafter.

Figure 1:
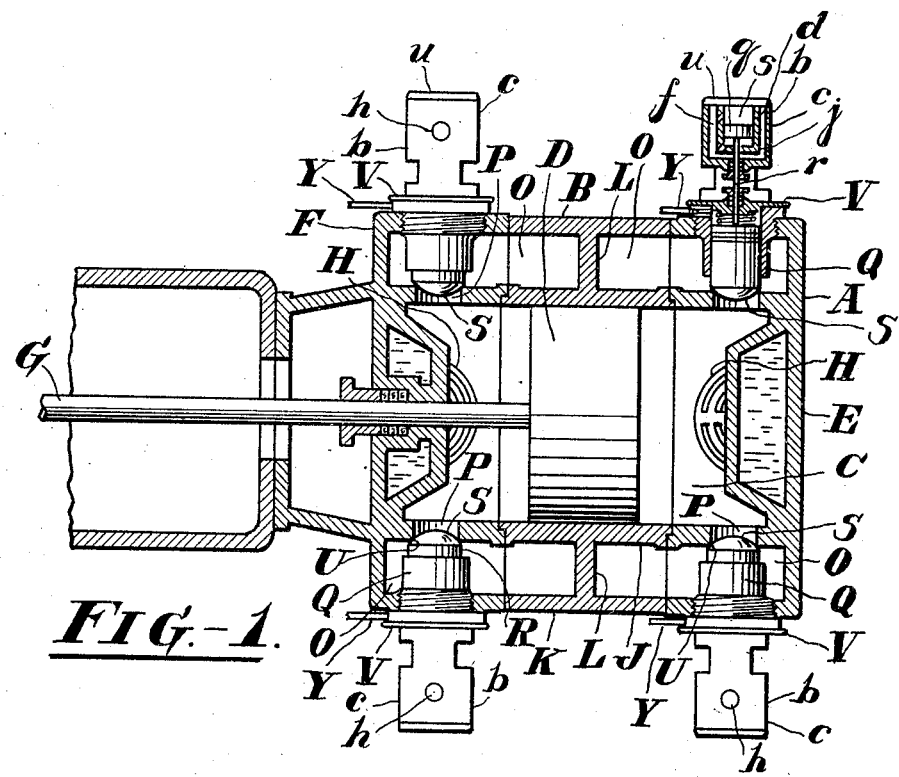
Figure 2:
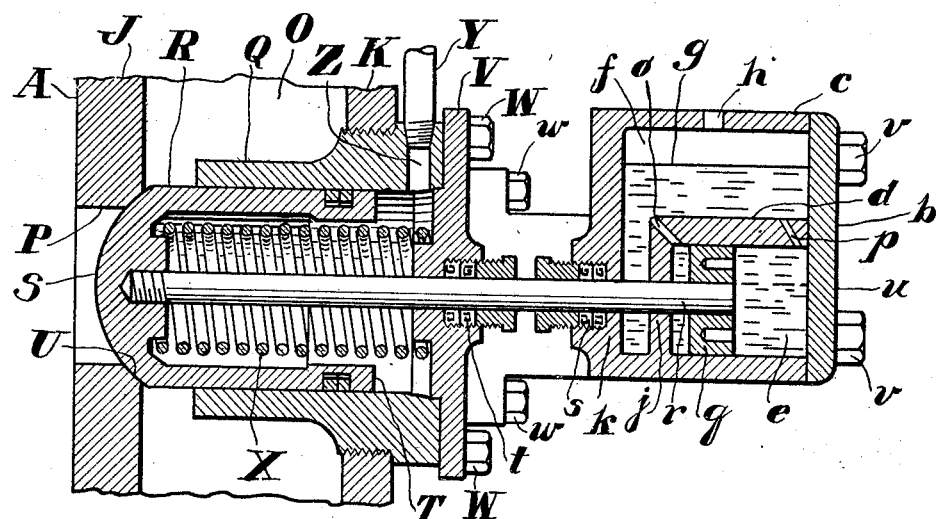

In the drawings forming part of the specification and in which similar reference characters refer to similar parts, Figure 1 is a horizontal longitudinal section through a compressor cylinder showing the clearance pockets and clearance valve mechanism, and Figure 2 is a vertical longitudinal section through the clearance valve mechanism and associated dash pot drawn to an enlarged scale.

Referring to the drawings, in which is shown one mode of application of the valve mechanism, A generally designates a compressor illustrated as of the double acting type and having a cylinder B provided with a piston chamber C in which is disposed a piston D. The cylinder B has end heads E and F which may be secured to the cylinder B in any suitable manner and in this instance a piston rod G secured to the piston D extends slidably through the head F for connection with a suitable prime mover (not shown).

The compressor A selected for illustrative purposes may be of any well known type having inlet valves H through which air enters the cylinder to be compressed and discharge valves (not shown) through which the compressed air may pass from the piston chamber C to a suitable storage receiver (not shown).

In the drawings the piston D and the heads E and F are provided with inner walls J and outer walls K spaced from the inner walls. Lateral walls L extending from the inner walls J to the outer walls K divide the space between the walls J and K into clearance chambers O, communication between which and the piston chamber C is afforded through ports P in the wall J.

Means are provided for controlling the ports P. To this end valve guides Q are threaded in the outer walls K in coaxial alignment with the ports P to serve as guides for clearance valves R disposed slidably therein. The clearance valves may be uniformly cylindrical throughout their lengths and have inner and outer pressure areas S and T respectively against which pressure fluid may act for operating the valves. In the type of clearance valves R disclosed the inner surfaces are of spherical shape conforming to seats U adjacent the outlet end of the ports P to form fluid tight joints therewith.

Suitable closures are provided for the outer ends of the valve guides Q in the form of covers V which are seated on the valve guides Q and which may be secured thereto by means of bolts W.

In order to at all times assure the retention of the clearance valves R on the seats U springs X are disposed in the clearance valves R to act thereagainst with one end and with their other ends against the cover plates V. Additional means, however, are provided for introducing pressure fluid into the valve guides Q to act against the outer pressure surfaces T for maintaining the valves R closed, and to this end pipes Y which may lead from suitable clearance regulating mechanism (not shown) are threaded into the valve guides Q and communicate with the interior of said guides through passages Z.

The type of clearance valves disclosed are particularly adapted for regulating the clearance volume of a compressor intended for continuous operation. The function of the clearance valves R is to control communication between the piston chamber C and the clearance pockets O. Normally when the pressure in the receiver tank into which the pressure fluid is delivered remains below a certain predetermined value, the clearance valves R will remain closed so that the full output of the compressor will be delivered to the storage receiver. After the pressure in the storage receiver reaches the predetermined value hereinbefore mentioned, the regulating mechanism will operate to open one or more of the clearance valves R to reduce the discharge pressure of the compressor. During the time, however, that the full capacity of the compressor is required, pressure fluid from said clearance regulator or from the storage receiver will be introduced into the valve guides Q to act against the pressure areas T for maintaining the valves R closed.

Valves of the type disclosed are particularly desirable for clearance regulation because of the simplicity of construction and ease of operation. One objectionable feature however, which is frequently present in this type of valve is the tendency of the valve to lift from the seat and return thereto as the pressure in the storage receiver approaches the value at which the valves are intended to open. Such movement of the valves results in objectionable noise and causes unnecessary wear on the cooperating surfaces of the valves and their seats. It is accordingly contemplated to prevent such erratic action of the valves and means are herein provided to assure a steady movement of the valves and thus to prevent all unnecessary wear. To this end the valves R are provided with dash pot mechanisms generally designated by $b$. Each dash pot mechanism $b$ comprises a casing $c$ having an internal wall $d$ which divides the casing into a piston chamber $e$ and a reservoir $f$ for oil $g$ which may be introduced into the reservoir through an opening $h$ in the casing $c$. The piston chamber $e$ is of less length than the reservoir $f$ and has an end wall $j$ which connects the wall $d$ with the casing. In this way a portion of the reservoir $f$ will lie between the end wall $j$ of the piston chamber $e$ and an inner end wall $k$ of the casing $c$. Passages $o$ and $p$ are formed in the wall $d$ at the inner and outer ends respectively of the piston chamber $e$ to assure a constant supply of oil from the reservoir $f$ into both ends of the piston chamber $e$.

Disposed within the piston chamber $e$ is a piston $q$ having a piston rod $r$ which extends through the reservoir $f$, the walls $j$, $k$ and through the cover plate V and is in threaded connection with the clearance valve R. Suitable packing means $s$ and $t$ may be disposed in the wall $k$ and in the cover V about the piston rod $r$ to assure against leakage of oil from the reservoir and pressure fluid from the interior of the valve guide Q. A closure for the outer ends of the reservoir $f$ and the piston chamber $e$ is provided in the form of a cover $u$ which may be secured to the casing $c$ by means of bolts $v$. Due to this arrangement the piston rod will at all times be thoroughly lubricated and the packing in the wall $k$ through which the rod $r$ extends will not be exposed to whatever pressure may be created in the piston chamber $e$.

As will be observed the casing $c$ is so disposed with respect to the port $p$ that the piston chamber $e$ will be in alignment with the clearance valve R and the dash pot mechanism is preferably supported by the cover plate V to which it may be secured by means of bolts $w$.

The modification selected for the purpose of illustration is intended more particularly for use in connection with clearance valves occupying positions approaching the horizontal. In this case therefore, it is desirable to so dispose the reservoir $f$ with respect to the piston chamber $e$ that an ample supply of oil in the reservoir will overlie the piston chamber. It will readily be seen however, that in case the clearance valve R occupies a vertical or nearly vertical position the casing $c$ may be so modified as to assure a suitable supply of oil to both ends of the piston chamber. This could readily be accomplished by permitting the reservoir to overlie the outer end of the piston chamber $e$.

During the normal operation of the compressor and while the pressure fluid in the storage receiver remains below that value at which it is intended to have the clearance valves R operate the said clearance valves will be held in closed position by the springs X and by pressure fluid entering the valve guide through the pipes Y and acting against the pressure surfaces T. If then, as sometimes happens, during certain periods of the operation of the compressor, the pressure within the piston chamber C tends to unseat the clearance valves R the oil acting against the outer end of the pistons $q$ will to some extent resist the action of the clearance valve. However, in the event that the pressure acting against the pressure surfaces S is sufficient to slightly unseat the clearance valves R the oil lying between the piston $q$ and the end walls $j$ will resist the pressure or pressures acting against the valves to return them to their seat and by gradually flowing from the piston chambers $e$ through the passages $o$ into the reservoirs $f$ will assure the gradual return of the clearance valves R to their seats, thus avoiding slamming of the clearance valves. The clearance valves R will therefore act evenly and consistently and as a result the life thereof as well as that of the associated elements will be greatly prolonged.

I claim:

1. A valve mechanism comprising a valve, a seat for the valve, an oil dash pot mechanism in alignment with the valve, said dash pot mechanism including a casing having an integral inner wall to divide said casing into a reservoir for oil and a piston chamber having one portion of its periphery formed by the casing, said wall being positioned in the casing to form a space therein and having passages for the flow of oil from the reservoir to the chamber, a rod connected to the valve and extending through the casing, the reservoir and the wall, a piston in the chamber connected to the rod to move therewith upon movement of the valve and create a pressure of the oil in the chamber, and a packing in the casing around the rod to prevent the escape of oil from the reservoir, said packing being protected from the pressure in the chamber by the space between the wall and the casing.

2. A valve mechanism comprising a valve, a seat for the valve, an oil dash pot mechanism in alignment with the valve, said dash pot mechanism including a casing having an open and a closed end, an integral inner wall projecting into the casing from one side thereof and having a closed end spaced from the closed end of the casing, said inner wall dividing the casing into a reservoir for oil and a piston chamber having one portion of its periphery formed by the casing, apertures in the inner wall providing passage for oil from the reservoir to the chamber, a cover for the open end of the casing, a rod connected to the valve and extending through the closed end of the casing and the closed end of the piston chamber, a piston in the chamber connected to the rod to move therewith upon movement of the valve and create a pressure of the oil in the chamber, and a packing in the casing around the rod to prevent the escape of oil from the reservoir, said packing being protected from the pressure in the chamber by the space between the wall and the casing.

In testimony whereof I have signed this specification.

JOHN LE VALLEY.